United States Patent
Vittur et al.

(10) Patent No.: US 9,505,044 B2
(45) Date of Patent: Nov. 29, 2016

(54) METHOD OF TREATING PRODUCED OR FLOWBACK WATER WITH NUCLEOPHILIC AGENT TO DEACTIVATE BREAKER

(71) Applicant: Baker Hughes Incorporated, Houston, TX (US)

(72) Inventors: Brandon Mark Vittur, Houston, TX (US); Charles David Armstrong, Tomball, TX (US); Marshall G. Ault, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/524,173

(22) Filed: Oct. 27, 2014

(65) Prior Publication Data

US 2015/0129231 A1 May 14, 2015

Related U.S. Application Data

(60) Provisional application No. 61/903,828, filed on Nov. 13, 2013.

(51) Int. Cl.

| | | |
|---|---|---|
| C09K 8/68 | (2006.01) | |
| B09C 1/08 | (2006.01) | |
| B09C 1/00 | (2006.01) | |
| C09K 8/88 | (2006.01) | |
| C09K 8/90 | (2006.01) | |
| C02F 101/32 | (2006.01) | |
| C02F 103/06 | (2006.01) | |

(52) U.S. Cl.
CPC . *B09C 1/08* (2013.01); *B09C 1/00* (2013.01); *B09C 1/002* (2013.01); *C09K 8/68* (2013.01); *C09K 8/685* (2013.01); *C09K 8/885* (2013.01); *C09K 8/887* (2013.01); *C09K 8/90* (2013.01); *B09C 2101/00* (2013.01); *C02F 2101/32* (2013.01); *C02F 2103/06* (2013.01); *C09K 2208/26* (2013.01)

(58) Field of Classification Search
None
See application file for complete search history.

(56) References Cited

U.S. PATENT DOCUMENTS

| | | | | |
|---|---|---|---|---|
| 5,575,899 A * | 11/1996 | Nakakoji | ............... | C25D 3/565 205/246 |
| 2008/0029266 A1* | 2/2008 | Starkey | .................. | C04B 28/02 166/266 |
| 2008/0053900 A1* | 3/2008 | Shafer | ...................... | C02F 9/00 210/631 |
| 2008/0287323 A1* | 11/2008 | Li | ............................ | C12N 9/99 507/211 |
| 2010/0190666 A1* | 7/2010 | Ali | .......................... | C09K 8/68 507/235 |
| 2010/0204068 A1* | 8/2010 | Kesavan | ............. | C08B 37/0096 507/211 |
| 2010/0218950 A1* | 9/2010 | Starkey, II | .............. | C04B 28/02 166/285 |
| 2012/0168364 A1* | 7/2012 | Evans | .................. | C02F 1/5236 210/202 |
| 2012/0289436 A1* | 11/2012 | Woodward | ........... | C07F 9/5407 507/111 |
| 2014/0041877 A1* | 2/2014 | Armstrong | ............... | C09K 8/68 166/308.1 |

\* cited by examiner

*Primary Examiner* — Angela M DiTrani
*Assistant Examiner* — Anuradha Ahuja
(74) *Attorney, Agent, or Firm* — John Wilson Jones

(57) ABSTRACT

Produced or flowback water from an underground reservoir having been treated with a fluid containing a viscosifying polymer and a vitamin $B_1$ and/or ylide breaker may be recycled by deactivating the vitamin $B_1$ and/or ylide breaker with a sulfur or phosphorus containing nucleophilic agent.

19 Claims, No Drawings

METHOD OF TREATING PRODUCED OR FLOWBACK WATER WITH NUCLEOPHILIC AGENT TO DEACTIVATE BREAKER

The application claims benefit to U.S. patent application No. 61/903,828 filed on Nov. 13, 2013 which is herein incorporated by reference.

FIELD OF THE DISCLOSURE

The disclosure relates to a method of treating produced water or flowback water with a sulfur or phosphorus containing nucleophilic agent in order to deactivate a vitamin $B_1$ breaker.

BACKGROUND OF THE DISCLOSURE

Water produced from well treatment operations, including stimulation operations for enhancing the recovery of hydrocarbons from subterranean formations, is often laden with a significant concentration of contaminants.

A common stimulation operation is hydraulic fracturing wherein fractures are created in subterranean formations which extend from the wellbore into the rock. The rate at which fluids can be produced from the formation is increased by this operation. The treatment design generally requires the fluid to reach maximum viscosity as it enters the fracture in order to transport proppant into the formation. Viscosifying polymers are often included in the fluid in order to provide the requisite viscosity. Proppant remains in the produced fracture to prevent the complete closure of the fracture and to form a conductive channel extending from the wellbore into the treated formation. Once the high viscosity fluid has carried the proppant into the formation, breakers reduce the fluid's viscosity.

Typically, a large amount of water is used during a stimulation operation. For instance, during a hydraulic fracturing operation, water is pumped into fractures at pressures exceeding 3000 psi and flow rates exceeding 85 gallons per minute. A horizontal well with a 4,500 foot lateral bore may use about 4 to 5 million gallons of water.

In addition to facilitating settling of the proppant in the fracture, breakers also facilitate fluid flowback to the well. The fluid which returns to the surface from a fracturing operation is either flowback water or produced water. In addition to natural salinity of water in the formation, fresh water that is forced down a well during the fracturing operation tends to dissolve salts in the formation thus giving the recovered water very high salinity. Thus, flowback water typically is characterized by high salinity and dissolved solids and often contains the same chemicals which are pumped into the well. In addition, flowback water contains contaminants which are present in rock formation water. Flowback of fluids from the well requires a high volume of water. In some instances, the volume of water may be as high as 40,000 bbl.

At a point in the treatment operation, there is a transition between flowback water to produced water. Produced water contains clay, dirt, metals, chemicals and even diesel that may have been added during the operation. After the recovery of flowback fluids, an additional 10,000 to 30,000 bbl of produced water may flow for up to two years. The point at which flowback water becomes produced water is difficult to distinguish, yet may be discerned from the chemistry of flowback water versus naturally occurring water produced by the formation.

Increased interest in minimizing environmental risk from chemicals has led to the development of alternative breakers for use in high-temperature fluids. While enzymes have been used for many years, their use is often limited due to polymer specificity and thermal stability. Breakers derived from biological sources and displaying catalytic, polymer degrading activity has been reported in U.S. Pat. No. 9,090,814. Being catalytic, renewable, biodegradable and non polymer-specific, such breakers do not display the thermal denaturation limitations of enzyme breakers and thus can be used over wider temperature range. Such breakers include vitamin $B_1$ which has now been examined for use in the recycling of flowback water and produced water.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method is provided wherein produced water or flowback water from an underground reservoir is first mixed with a sulfur or phosphorus containing nucleophilic agent. The produced water or flowback water contains residual polymer from a well treatment operation or remnants thereof including partially degraded polymer or fully degraded polymer. The produced water or flowback water further contains a vitamin $B_1$ breaker and/or an ylide. The vitamin $B_1$ and/or ylide breaker may be deactivated with the sulfur or phosphorus containing nucleophilic agent. Recyclable water containing the deactivated vitamin $B_1$ and/or ylide may be recycled into the underground reservoir.

In another embodiment, a method of treating a fluid after a subterranean formation has been fractured is disclosed. The method comprises reducing the viscosity of the fracturing fluid by at least partially degrading the viscosifying polymer in the fluid with a vitamin $B_1$ breaker or an ylide. Vitamin $B_1$ or the ylide in the resulting fluid which has reduced viscosity may then be deactivated with a sulfur or phosphorus containing nucleophilic agent.

In another embodiment, a method of treating produced or flowback water comprising residual viscosifying polymer is disclosed which comprises adding a vitamin $B_1$ and/or ylide as breaker to the produced or flowback water and reducing the viscosity of the residual viscosifying polymer. A sulfur or phosphorus containing nucleophilic agent is then added to the produced or flowback to deactivate the vitamin $B_1$ and/or ylide.

In another embodiment, a method of fracturing a subterranean formation is disclosed wherein a well treatment fluid comprising a viscosifying polymer and vitamin $B_1$ and/or an ylide is pumped into the formation and a fracture is initiated or created. The viscosity of the well treatment fluid may then be reduced by interaction of vitamin $B_1$ with the viscosifying polymer. Produced water or flowback water is then flowed out of the well and treated with a phosphorus or sulfur containing nucleophilic agent to deactivate vitamin $B_1$ and/or the ylide. The produced water or flowback water may be recycled into the well. In an embodiment, the recycled water may contain a viscosifying agent.

In another embodiment, a method is provided of treating water produced during a well treatment operation, the produced water containing (i) residual viscosifying polymer which may be partially or fully degraded and (ii) a vitamin $B_1$ breaker and/or an ylide. A sulfur or phosphorus containing nucleophilic agent is pumped into the well and the vitamin $B_1$ breaker and/or ylide is deactivated.

In another embodiment, a method of treating an underground reservoir penetrated by a subterranean formation is provided wherein a treatment fluid comprising a viscosifying polymer and vitamin $B_1$ and/or an ylide as breaker is first pumped into the reservoir. The viscosity of the treatment fluid is reduced by at least partially degrading the viscosifying polymer with vitamin $B_1$ and/or ylide. A sulfur or phosphorus containing nucleophilic agent is then pumped into the underground reservoir. The vitamin $B_1$ and/or ylide is deactivated with the sulfur or phosphorus containing nucleophilic agent.

Accordingly, the present disclosure includes features and advantages which are believed to enable it to advance the treatment of produced or flowback water and the recycling of produced water or flowback water. Characteristics and advantages of the present disclosure described above and additional features and benefits will be readily apparent to those skilled in the art upon consideration of the following detailed description of various embodiments.

DETAILED DESCRIPTION OF THE PREFERRED EMBODIMENTS

It should be understood that the description herein is not intended to limit the claims of this patent or any patent. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ". Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In the method disclosed herein a well treatment fluid which contains a vitamin $B_1$ breaker and/or glide is treated with a sulfur or phosphorus containing nucleophilic agent. The sulfur or phosphorus containing nucleophilic agent deactivates the vitamin $B_1$ and/or ylide breaker.

The method disclosed herein may be used to treat produced water or flowback water from an underground reservoir which contains a vitamin $B_1$ breaker. Vitamin $B_1$ contains an ylide functional group. Other compounds containing an ylide functional group may also be acceptable as the breaker in addition to or in lieu of vitamin $B_1$. After deactivation of vitamin $B_1$ and/or the ylide, the produced or flowback water may be recycled and used in a subsequent well treatment operation.

The underground reservoir preferably is a gas well, an oil well, or a geothermal well.

The vitamin $B_1$ or ylide may be a component of a well treatment fluid, such as a fracturing fluid. The well treatment fluid may further contain a viscosifying polymer. Where the well treatment fluid is a fracturing fluid, the fluid is pumped into the reservoir at a pressure sufficient to initiate or create a fracture in the reservoir.

In a preferred embodiment, the pH of the well treatment fluid containing the vitamin $B_1$ breaker is between from about 5.5 to about 6.0.

At in-situ downhole conditions, the vitamin $B_1$ and/or ylide breaker decreases the viscosity of the fluid by breaking or degrading the viscosifying polymer. In some instances, the viscosifying polymer is partially degraded by interaction with vitamin $B_1$, the compound having the ylide functionality or both. In other instances, the viscosifying polymer is completely degraded by interaction with vitamin $B_1$ and/or ylide.

Suitable ylides include phosphonium ylides (such as those of the formula P, sulfonium ylides, sulfoxonium ylides, carbonyl ylides, oxonium ylides, nitrogen-based ylides such as azomethine ylids, and halonium ylides such as those prepared from allyl halides and metal carbenoids. In a preferred embodiment, such ylides contain $C_1$-$C_8$ alkyl groups, $C_6$-$C_{14}$ aryl groups or substituted alkyl or aryl groups.

Suitable carbonyl ylides include those of the formula (depicted in a multiple bond form in their ylene resonance structure) $R^1R^2C=O^+C^-R^3R^4$; suitable azomethine ylides include those of the formula of the $R^1R^2C=NR^{5+}C^-R^3R^4$; suitable oxonium ylides are those of the formula $R^1R^2C-O^+C^-R^3R^4$; suitable phosphonium ylides are those of the formula $R^1R^2R^3P^-C^-R^4R^5$; wherein $R^1$, $R^2$, $R^3$, $R^4$ and $R^5$ are preferably hydrogen, a $C_1$-$C_8$ alkyl or substituted alkyl group or a $C_6$-$C_{14}$ aryl group or substituted aryl group.

Vitamin $B_1$ and breakers containing an ylide functionality are biodegradable, non-toxic, and biocompatible breakers based on renewable resources. The breaker effectively hydrolyzes viscosifying polymers of viscous fluids at elevated temperature ranges, such as in excess of 75° F., typically over pH ranges between from about 8.0 to about 12.0 with the maximum activity at pH from about 10.0 to about 11.5. The breaker hydrolyzes the viscosifying polymer at temperatures in excess of 225° F. as well as in excess of 300° F.

Produced water or flowback water exiting the well may contain the vitamin $B_1$ and/or ylide breaker as well as partially degraded or fully degraded viscosifying polymer. Produced water or flowback water exiting the well may further contain residual viscosifying polymer which has not been degraded. The nucleophilic agent may then be introduced to the produced water or flowback water. The nucleophilic agent deactivates the vitamin $B_1$ breaker and/or ylide.

Produced water, as used herein, refers to water that is produced when oil and gas are recovered from the formation and includes the natural water layer or formation water that lies under the hydrocarbons as well as any additional water which is pumped into the reservoir in order to achieve maximum hydrocarbon recovery by forcing the hydrocarbons to the surface.

Flowback water may be characterized as having high salinity and total dissolved solids (TDS). It is laden with the same fracturing chemicals that were pumped into the well, in addition to any unique contaminants that are present in the rock formation water deep below. Flowback water typically contains clay, dirt, metals, chemicals and even diesel. Flowback water may contain from about 15 to about 40% percent of the volume of fluid that is injected into the well which flows back over an extended period of time after fracturing is complete. It further includes produced water and any fresh water that is forced down the well which dissolves salts in the formation. This attributes to the high salinity of the recovered water. Dissolved hydrocarbons as well as minerals from the formation (including barium, calcium, iron, magnesium and sulfur) may further be present in produced or flowback water.

In an embodiment, the produced water or flowback water may be treated, after being removed from the well, with vitamin $B_1$ and/or ylide in order to reduce the viscosity of the fluid. A sulfur or phosphorus containing nucleophilic agent may then be introduced to the fluid to deactivate the vitamin $B_1$ and/or ylide. In an embodiment, the nucleophilic agent may be added to the produced water or flowback simultaneously with vitamin $B_1$ and/or ylide.

The reaction time for deactivation of vitamin $B_1$ or the ylide or both vitamin $B_1$ and ylide by the nucleophilic agent may be dependent on pH, the molar ratio of nucleophilic agent to vitamin $B_1$ and/or ylide and temperature. In one instance, the reaction time may be up to 24 hours at ambient temperature.

The method disclosed herein is particularly effective in hydraulic fracturing operations. In an embodiment, a viscosifying polymer may be introduced to the produced water or flowback water after deactivation of the breaker with the sulfur or phosphorus containing nucleophilic agent. The resulting fluid may then be pumped into the formation as a fracturing fluid.

Thus, a hydraulic fracturing operation may first be performed by pumping into the formation a (first) fluid having a vitamin $B_1$ breaker, an ylide or both vitamin $B_1$ breaker and ylide and a viscosifying polymer. After fracture(s) are initiated or created, produced or flowback water containing vitamin $B_1$ and/or ylide and partially degraded, fully degraded or non-degraded viscosifying polymer may be removed from the well. A nucleophilic agent may then be added to the fluid to deactivate the vitamin $B_1$ breaker and/or the ylide. The produced or flowback water may then be recycled into the formation by the addition of viscosifying polymer to the fluid to render a (second) fracturing fluid. The viscosifying polymer of the first and the second fluids may be the same or different. The second fracturing fluid may further contain a breaker which may be vitamin $B_1$, an ylide or an enzymatic or oxidative breaker. A combination of such breakers may also be used.

The nucleophilic agent preferably contains at least one set of lone electron pairs and preferably is a sulfur or phosphorus containing nucleophile. The nucleophilic agent may be inorganic or organic. In a preferred embodiment, the nucleophile agent is a sulfite or bisulfite, such as sodium sulfite, a metal bisulfite, or potassium bisulfite. Other preferred nucleophilic agents include phosphites, phosphates, amines (primary and secondary), alcohols, and hydroxides. In one embodiment, the nucleophilic agent is cysteine or a thiol.

In a preferred embodiment, the molar ratio of nucleophilic agent to breaker is from about 250:1 to about 750:1, preferably about 500:1 though molar ratios as low as 1:1 may be used.

The nucleophilic agent may be dissolved in a solvent such as water, brine, or alcohols. The pH of a solution containing the nucleophilic agent is preferably between from about 3.9 to about 5.2.

The use of recycled water from produced water as well recycled water from flowback water has particular applicability in the treatment of formations where disposal of produced or flowback water is difficult or environmentally challenging.

The method disclosed herein allows for a large percentage of produced water or flowback water to be re-used before it is released back into the environment. In an embodiment, almost 60% of the produced water or flowback water may be reused.

The disclosure provided herein finds particular applicability in the recovery of hydrocarbons from shale, including Marcellus shale.

Further, the method described herein finds particular applicability in sites where multiple wells are in close proximity to each other.

In an embodiment, the aqueous fluid set forth in the disclosure may be prepared by blending a hydratable viscosifying polymer into an aqueous fluid. The vitamin $B_1$ breaker and/or ylide may be a component of the aqueous fluid at the time of addition of the viscosifying polymer. Alternatively, the vitamin $B_1$ breaker and/or ylide may be added to the aqueous fluid after the addition of the viscosifying polymer. The aqueous fluid may be water, brine, or a water-alcohol mixture. Any suitable mixing apparatus may be used for this procedure. In the case of batch mixing, the hydratable polymer and aqueous fluid are blended for a period of time which is sufficient to form a hydrated sol. The hydratable polymer is added to the aqueous fluid in concentrations ranging from about 0.10% to 5.0% by weight of the aqueous fluid. The most preferred range is from about 0.20% to about 0.80% by weight.

Typically, the amount of breaker used in the treatment fluid is from about 0.5 to about 30 gpt, more typically between from about 1.0 to about 5.0 gpt.

The hydratable polymer may contain one or more functional groups, such as a hydroxyl, carboxyl, carboxymethyl, hydroxypropyl, sulfate, sulfonate, amino or amido group. Preferred polymers include polysaccharides and derivatives thereof, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Suitable polysaccharides and derivatives include those which contain one or more monosaccharide units of galactose, fructose, mannose, glucoside, glucose, xylose, arabinose, glucuronic acid and pyranosyl sulfate. These include non-derivatized and derivatized guar gums, locust bean gum, tara, xanthan, succinoglycan, scleroglucan and carrageenan. These polysaccharides include guar gums and derivatives, starches and galactomannan gums. In a preferred embodiment, guar gum may be underivatized guar or a derivatized guar, such as a hydroxyalkyl guar (like hydroxypropyl guar), a carboxyalkyl guar (like carboxymethyl guar) and a carboxyalkylhydroxyalkyl guar like carboxymethylhydroxypropyl).

In a preferred embodiment, the hydratable polymer is underivatized guar or a derivatized guar. Preferred derivatized guars include hydroxypropyl guar, carboxymethyl guar, and carboxymethyl hydroxypropyl guar.

Further, the polysaccharide may be a cellulose or cellulose derivative such as an alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

In addition to the breaker and hydratable polymer, the fluid may include a crosslinking agent. Suitable crosslinking agents include borate ion releasing compounds, organometallic or organic complexed metal ions comprising at least one transition metal or alkaline earth metal ion as well as mixtures thereof.

Borate ion releasing compounds which can be employed include, for example, any boron compound which will supply borate ions in the fluid upon disassociation from the deformable core. Such compounds include boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 8.0 to 12) for crosslinking to occur.

Further preferred crosslinking agents are those, such as organometallic and organic complexed metal compounds, which can supply trivalent or higher polyvalent metal ions into the fluid upon their disassociation from the deformable core. Examples of the trivalent or higher polyvalent metal ions include boron, titanium, zirconium, aluminum, yttrium, cerium, etc. or a mixture thereof. Examples of titanium compounds include titanium ammonium lactate, titanium triethanolamine, titanium acetylacetonate, titanium diisopropoxide bisacetyl aminate, titanium tetra(2-ethyl hexoxide), titanium tetraisopropoxide, titanium di(n-butoxy) bistriethanol aminate, titanium isopropoxyoctylene glycolate, and titanium diisopropoxy bistriethanol aminate and titanium chloride. Examples of zirconium salts include zirconium ammonium carbonate, zirconium carbonate, zirconium acetylacetonate, zirconium diisopropylamine lactate, zirconium chloride, zirconium lactate, zirconium lactate triethanolamine, zirconium oxyacetate, zirconium acetate, zirconium oxynitrate, zirconium sulfate, tetrabutoxyzirconium (butyl zirconate), zirconium mono(acetylacetonate), zirconium n-butyrate and zirconium n-propylate. The crosslinking agent may optionally be encapsulated. Examples of typical crosslinking agents include, but are not limited to, those described in U.S. Pat. No. 4,514,309 and U.S. Pat. No. 5,247,995, which are incorporated herein by reference.

The crosslinking agent can be polymers with metal ions including aluminum, antimony, zirconium and titanium containing compounds including the so-called organotitanates as well as borates and boron releasing compounds. In the case of the borate crosslinkers, the crosslinking agent is any material which supplies borate ions. Suitable borate crosslinkers include organoborates, monoborates, polyborates, mineral borates, boric acid, sodium borate, including anhydrous or any hydrate, borate ores such as colemanite or ulexite as well as any other borate complexed to organic compounds to delay the release of the borate ion. Borate crosslinking agents are preferred.

The crosslinking agent is preferably present in the range from about 0.001% to in excess of 0.5% by weight of the aqueous fluid. Preferably, the concentration of crosslinking agent is in the range from about 0.005% to about 0.25% by weight of the aqueous fluid.

The optimum pH of the aqueous fluid containing the crosslinkable polymer is alkaline and typically greater than or equal to 8.0, more typically greater than or equal to 9.0, most typically between from about 9.5 to about 12.0.

When used as a fracturing fluid, the fluid may further contain a proppant which are normally added to the fluid prior to the addition of the optional crosslinking agent. Suitable proppants include those conventionally known in the art including quartz sand grains, glass beads, aluminum pellets, ceramics, plastic beads, including polyamides, and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc.

Further the proppant may include porous ceramics or organic polymeric particulates. The porous particulate material may be treated with a non-porous penetrating material, coating layer or glazing layer. For instance, the porous particulate material may be a treated particulate material, as defined in U.S. Patent Publication No. 20050028979 wherein (a) the ASG of the treated porous material is less than the ASG of the porous particulate material; (b) the permeability of the treated material is less than the permeability of the porous particulate material; or (c) the porosity of the treated material is less than the porosity of the porous particulate material.

The propping agents are normally used in concentrations between about 1 to 8 pounds per gallon of fracturing fluid composition, but higher or lower concentrations can be used as required.

The fluid may also contain other conventional additives common to the well service industry such as surfactants, corrosion inhibitors, crosslinking delaying agents and the like.

The well treatment fluid may be prepared on location using a high shear foam generator or may be shipped to the desired location.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

EXAMPLES

Example 1

The pH of water containing vitamin $B_1$ was adjusted to be between from about 5.5 to about 6.0. Sodium bisulfite was then added to obtain a molar ratio of 500:1 sulfite:vitamin $B_1$ or 0.173 g sodium bisulfite per mg of vitamin $B_1$ The reaction time was 24 hours at ambient temperature. A fracturing fluid was then prepared using an aqueous crosslinked fluid containing a borated crosslinked underivatized guar, buffered to a pH between from about 9.5 to about 10.5, prepared as set forth in U.S. Patent Publication No. 2005/0272612. A portion of the fluid containing the sulfite and vitamin $B_1$ was then added to the fracturing fluid.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the methods disclosed herein are possible and contemplated by the patent applicant(s), within the scope of the appended claims, and may be made and used by one of ordinary skill in the art without departing from the spirit or teachings of the disclosure. Thus, all matter herein set forth should be interpreted as illustrative, and the scope of the disclosure and the appended claims should not be limited to the embodiments described and shown herein.

What is claimed is:

1. A method comprising:
   (a) mixing produced water or flowback water from an underground reservoir with a sulfur or phosphorus containing nucleophilic agent, wherein the produced water or flowback water comprises a viscosifying polymer or a remnant thereof and a vitamin $B_1$ breaker, an ylide breaker or both a vitamin $B_1$ breaker and an ylide breaker;
   (b) deactivating the vitamin $B_1$ breaker, ylide breaker or both vitamin $B_1$ breaker and glide breaker with the sulfur or phosphorus containing nucleophilic agent to render recyclable water; and
   (c) pumping the recyclable water into the underground reservoir.

2. The method of claim 1, wherein the underground reservoir is a gas well, an oil well, or a geothermal well.

3. The method of claim 1, wherein the sulfur or phosphorus containing nucleophilic agent has at least one set of lone pair electrons.

4. The method of claim 1, wherein the sulfur or phosphorus containing nucleophilic agent is an inorganic compound.

5. The method of claim 4, wherein the sulfur or phosphorus containing nucleophilic agent contains sulfur.

6. The method of claim 5, wherein the sulfur containing nucleophilic agent is a sulfite or a bisulfate.

7. The method of claim 6, wherein the sulfur or phosphorus containing nucleophilic agent is a solution of sodium sulfite.

8. The method of claim 1, wherein the viscosifying polymer is (i) a synthetic polymer selected from the group consisting of polyvinyl alcohols, polyacrylates, polypyrrolidones and polyacrylamides; or (ii) a polysaccharide selected from the group consisting of cellulosic derivatives, galactomannan or a galactomannan derivative, xanthan, succinoglycan and scleroglucan; and mixtures thereof.

9. The method of claim 8, wherein the polysaccharide is selected from the group consisting of guar gum, hydroxypropylguar, carboxymethylguar, carboxymethylhydroxypropylguar, xanthan gum and scleroglucan.

10. The method of claim 1, wherein the viscosifying polymer is at least partially crosslinked.

11. A method of treating a fluid of reduced viscosity after a subterranean formation penetrated by a well has been fractured by a hydraulic fracturing operation using a fracturing fluid, the fracturing fluid comprising a viscosifying polymer and a vitamin $B_1$ breaker, an ylide breaker or both a vitamin $B_1$ breaker and an ylide breaker, the method comprising:
   (a) reducing the viscosity of the fracturing fluid by at least partially degrading the viscosifying polymer with the vitamin $B_1$, ylide or both vitamin $B_1$ and ylide to provide the fluid with reduced viscosity;
   (b) deactivating vitamin $B_1$, ylide or both vitamin $B_1$ and ylide within the fluid of reduced viscosity by adding to the fluid of reduced viscosity a sulfur or phosphorus containing nucleophilic agent
wherein the fluid of reduced viscosity is produced water or flowback water.

12. The method of claim 11, wherein the produced water or flowback water is removed from the well prior to deactivation of vitamin $B_1$, ylide or both vitamin $B_1$ and ylide with the sulfur or phosphorus containing nucleophilic agent.

13. The method of claim 11, wherein the sulfur or phosphorus containing nucleophilic agent has a lone pair of electrons.

14. The method of claim 11, wherein the sulfur containing nucleophilic agent is a sulfite or bisulfate.

15. A method of treating produced or flowback water comprising residual viscosifying polymer, the method comprising
   (a) adding vitamin $B_1$, an ylide or both vitamin $B_1$ and an ylide to the produced or flowback water and reducing the viscosity of the produced or flowback water; and
   (b) adding a sulfur or phosphorus containing nucleophilic agent to the produced or flowback water to deactivate the vitamin $B_1$, ylide or both vitamin $B_1$ and ylide.

16. A method of stimulating a subterranean formation penetrated by a well comprising:
   (a) pumping into the well a well treatment fluid comprising a first viscosifying polymer and vitamin $B_1$, an ylide or both vitamin $B_1$ and an ylide at a pressure sufficient to create or initiate a fracture;
   (b) reducing the viscosity of the well treatment fluid with the vitamin $B_1$, ylide or both vitamin $B_1$ and ylide;
   (c) flowing produced water or flowback water from the well;
   (d) deactivating the vitamin $B_1$, ylide or both vitamin $B_1$ and ylide within the produced water or flowback water by adding to the produced water or flowback water a sulfur or phosphorus containing nucleophilic agent;
   (e) adding a second viscosifying polymer to the produced water or flowback water to render a second treatment fluid and pumping the second treatment fluid into the well at a pressure sufficient to create or initiate a fracture within the formation.

17. The method of claim 16, wherein the second treatment fluid further comprises a breaker.

18. The method of claim 17, wherein the sulfur or phosphorus containing nucleophilic agent has a lone pair of electrons.

19. The method of claim 16, wherein the sulfur containing nucleophilic agent is a sulfite.

* * * * *